J. BRAUN.

APPARATUS FOR DRYING WEARING-APPAREL.

No. 7,166. Reissued June 13, 1876.

WITNESSES.

H. S. Talbot

Edward Edmunds

INVENTOR.

Joseph Braun.

By Sylvanus Walker

Atty

N. PETERS, PHOTO-LITHOGRAPHER, WASHINGTON, D. C.

UNITED STATES PATENT OFFICE.

JOSEPH BRAUN, OF ROCHESTER, PENNSYLVANIA, ASSIGNOR, BY MESNE ASSIGNMENTS, TO SYLVENUS WALKER, OF BOSTON, MASSACHUSETTS.

IMPROVEMENT IN APPARATUS FOR DRYING WEARING APPAREL.

Specification forming part of Letters Patent No. 69,171, dated September 24, 1867; reissue No. 7,166, dated June 13, 1876; application filed January 14, 1876.

*To all whom it may concern:*

Be it known that I, JOSEPH BRAUN, of Rochester, in the county of Beaver and State of Pennsylvania, have invented a new and useful Improvement in Apparatus for Shaping and Pressing Pantaloons and other Wearing Apparel by Steam, of which the following is a specification:

The nature of my invention consists in a hollow expansible metallic core, the form of which corresponds to that part of the human body to which the garment is adapted, with such variations as the prevailing mode may require.

The expansibility of the core or former admits of its adjustment so as to be adapted to various sizes of pants to be dried, formed, and pressed by means of the steam which is admitted into the interior of the same.

The metal hollow former being made in three separate parts, and connected by springs and pins, so as to admit the steam to pass into each, and allow the parts to be moved out from or in toward each other, and be held in the desired position by means of suitable springs, allows a great number of sizes of pants or other similar apparel to be dried, pressed, and formed upon a single expansible core or former, which could not be done by those heretofore constructed all in one part. This I consider the most essential and important feature of my invention, which will be hereinafter more fully set forth.

Figure 1:
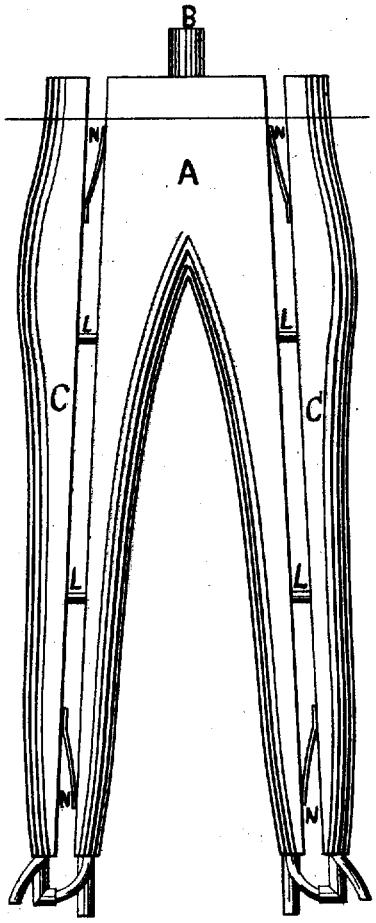
Figure 3:
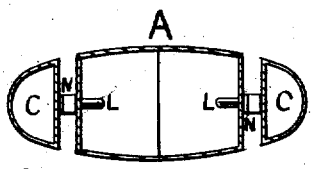

Figure 1 is a front plan view of my invention, showing the expanders upon the sides of same. Fig. 2 is a horizontal section of Fig. 1.

A represents a hollow metal core, into which steam is admitted by the pipe B, and thence into the hollow adjustable expansible parts C C′, by the springs and pins and the metal pipes E E′, with a sliding steam-tight joint, which permits the parts C C to move from or toward the part A freely, so as to allow the form consisting of these three parts A C C′ to be extended or withdrawn, so as to fit any size of pants desired to be dried, shaped, and pressed thereon.

To the bottom of the parts C C′ are fitted the pipes H H′, for conveying off the water formed by the condensation of steam within the metal former. The parts C C′ are held in the desired relation to the part A by means of pins L, and are adjusted or expanded by means of the springs N, adapted to accomplish the purpose.

The steam may be admitted into each seperate part at the top, if desired.

This construction of the former or core in parts, so it may be expanded or contracted to the size desired to fit various sizes of pants. may be modified in form to suit the taste or prevailing mode; also adapted in shape to fit coats as well, the expansion being applied to the body of the form, and also to the arms, as desired.

These cores or forms may be constructed of sheet metal, or any other suitable material.

It will be understood, in using my improved apparatus, that it will only be necessary that the pants, or other wearing apparel to be pressed, dried, and shaped, shall be sufficiently wet or moist to be shrunk when dried upon the core or form, to make them retain the same shape when removed from the core or former as was imparted to them by being dried, pressed, and shaped upon the same by the heat of the steam imparted thereto.

When the pants or other apparel are stretched, or brought in close contact with the core or former throughout all parts, to be dried and shaped or pressed, by expanding the core or former until they fit snugly over or upon the same, and are sufficiently stretched and made smooth, then secured in place from shrinking in length, they may be very quickly dried without injury to the cloth or its color; also avoiding all danger of shrinkage, which so often occurs when the garment is dried without being stretched, and held in the exact shape desired throughout while being dried, as heretofore.

Having thus described my invention, what I claim is—

1. An expansible core or former for drying, shaping, and pressing wearing apparel stretched upon the same, and adapted to be used with steam, essentially as and for the purposes set forth.

2. A hollow expansible metallic core, formed in sections or parts, and connected together by springs, pins, and pipes, which allow said parts to be expanded or adjusted so as to fit various sizes of wearing apparel, and permit the same to be stretched and dried into the desired shape by the admission of steam to its interior, as and for the purposes set forth.

JOSEPH BRAUN.

Witnesses:

SYLVENUS WALKER,
JOSEPH MILLER.